(12) United States Patent
Shinkawa et al.

(10) Patent No.: US 11,544,366 B2
(45) Date of Patent: Jan. 3, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Ayaka Shinkawa, Kanagawa (JP); Hideki Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 171 days.

(21) Appl. No.: 16/908,743

(22) Filed: Jun. 23, 2020

(65) Prior Publication Data

US 2021/0294882 A1 Sep. 23, 2021

(30) Foreign Application Priority Data

Mar. 18, 2020 (JP) ............................ JP2020-048224

(51) Int. Cl.
*G10L 15/22* (2006.01)
*G06F 21/32* (2013.01)
*G10L 17/22* (2013.01)

(52) U.S. Cl.
CPC .............. *G06F 21/32* (2013.01); *G10L 15/22* (2013.01); *G10L 17/22* (2013.01); *G10L 2015/227* (2013.01)

(58) Field of Classification Search
CPC ................................ G10L 17/00; G10L 15/22
See application file for complete search history.

(56) References Cited

U.S. PATENT DOCUMENTS

| 8,396,711 | B2* | 3/2013 | Yee ........................ G10L 17/24 |
| | | | 704/246 |
| 10,083,695 | B2* | 9/2018 | Buffum ................... G06F 21/32 |
| 2002/0147914 | A1* | 10/2002 | Arnold .................... G06F 21/32 |
| | | | 713/186 |
| 2007/0168190 | A1 | 7/2007 | Itagaki |
| 2017/0092278 | A1* | 3/2017 | Evermann ............... G10L 15/22 |
| 2021/0005190 | A1* | 1/2021 | Ji ............................ G06F 3/167 |
| 2021/0097158 | A1* | 4/2021 | Lee ......................... G06F 21/45 |
| 2021/0224367 | A1* | 7/2021 | Fleming .................. G10L 17/06 |

FOREIGN PATENT DOCUMENTS

| JP | 2007188001 | 7/2007 | |
| JP | 2007193138 | 8/2007 | |
| JP | 2017028355 | 2/2017 | |
| WO | WO-2006130958 A1 * | 12/2006 | ............. G10L 17/00 |

* cited by examiner

*Primary Examiner* — Daniel Abebe
(74) *Attorney, Agent, or Firm* — JCIPRNET

(57) ABSTRACT

An information processing apparatus includes a processor configured to acquire a voice of a user, authenticate the user by using the voice, and recognize the voice, and display operation screens that are different depending on an authentication result of the user and a recognition result of the voice and are used for an operation of executing processing on a display unit.

12 Claims, 9 Drawing Sheets

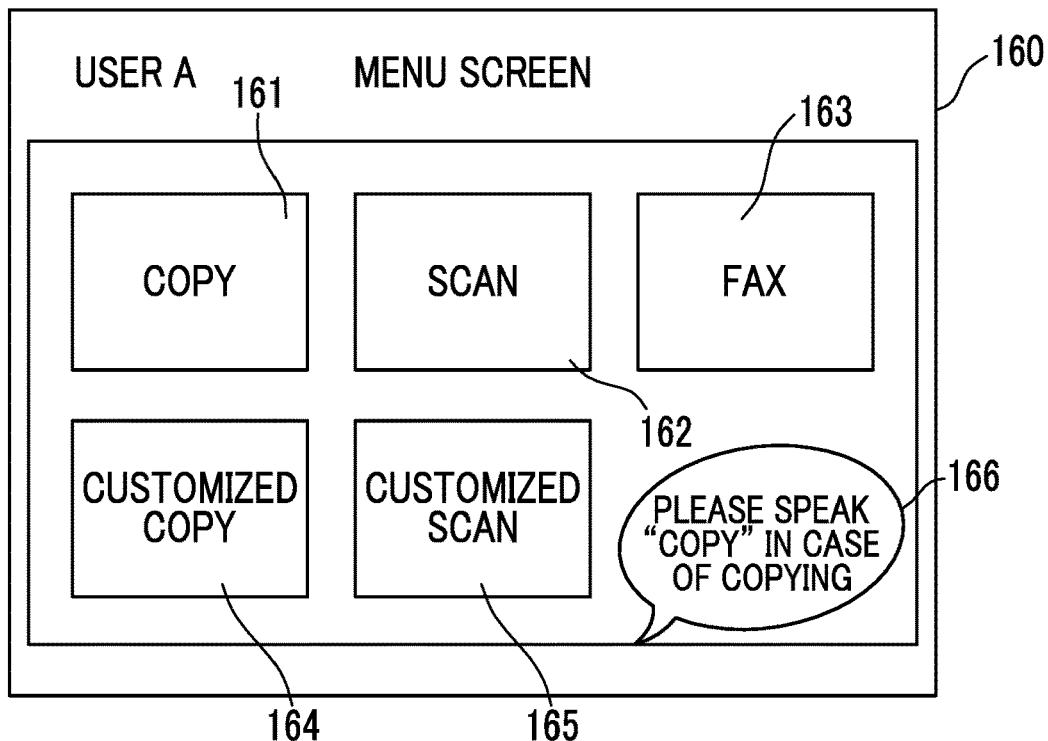

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-048224 filed Mar. 18, 2020.

BACKGROUND

(i) Technical Field

The present invention relates to an information processing apparatus and a non-transitory computer readable medium storing a program.

(ii) Related Art

There is known a technique for operating an apparatus using a voice. For example, JP2007-188001A describes a technique of acquiring a voice of a user, performing voice-print authentication, and executing processing according to text data obtained by voice recognition of this voice. JP2017-028355A describes a technique of receiving a voice in a case where a person approaches, performing voice recognition, generating a command, and supplying a power to a functional unit required to execute the command. JP2007-193138A describes a technique of recognizing a voice of a user, extracting a keyword, interacting with a user in order to exchange in a case where this keyword and a keyword registered in a voiceprint pattern file match each other, and performing an image forming operation according to an instruction of the voice of the user.

SUMMARY

In a case where the processing is executed only in a case where both the authentication of the user and the voice recognition succeed as in the technique described in JP2007-188001A, an operation of executing the processing is not received in a case where the user is not authenticated or the voice of the user is not recognized, and the processing is not executed.

Aspects of non-limiting embodiments of the present disclosure relate to an information processing apparatus and a non-transitory computer readable medium storing a program that are capable of executing processing depending on an authentication result of a user and a recognition result of a voice even though the user is not authenticated or the voice of the user is not recognized.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a voice of a user, authenticate the user by using the voice, and recognize the voice, and display operation screens that are different depending on an authentication result of the user and a recognition result of the voice and are used for an operation of executing processing on a display unit.

BRIEF DESCRIPTION OF THE DRAWINGS

Exemplary embodiment(s) of the present invention will be described in detail based on the following figures, wherein:

FIG. 7 is a diagram showing an example of a menu screen 160;

FIG. 8 is a diagram showing an example of an authentication result screen 170;

DETAILED DESCRIPTION

1. Constitution

Figure 1:
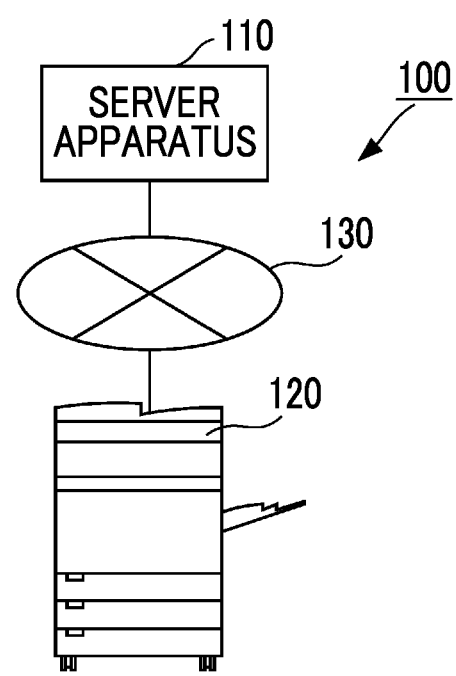
FIG. 1 is a diagram showing an example of a configuration of an image processing system 100 according to an exemplary embodiment.

FIG. 1 is a diagram showing an example of a configuration of an image processing system 100 according to an exemplary embodiment. The image processing system 100 includes a server apparatus 110 and an image processing apparatus 120. The server apparatus 110 and the image processing apparatus 120 are connected via a communication line 130 such as the Internet. The image processing apparatus 120 authenticates a user by using a voice of the user, recognizes the voice of the user, and receives an operation (hereinafter, referred to as a "voice operation") corresponding to a recognition result. In a case where the authentication of the user fails but the recognition of the voice succeeds, the server apparatus 110 determines whether or not to permit execution of processing of the image processing apparatus 120 based on an image to be processed by the image processing apparatus 120. The server apparatus 110 has a function of recognizing a text included in the image. This function is realized by optical character recognition (OCR), for example.

Figure 2:
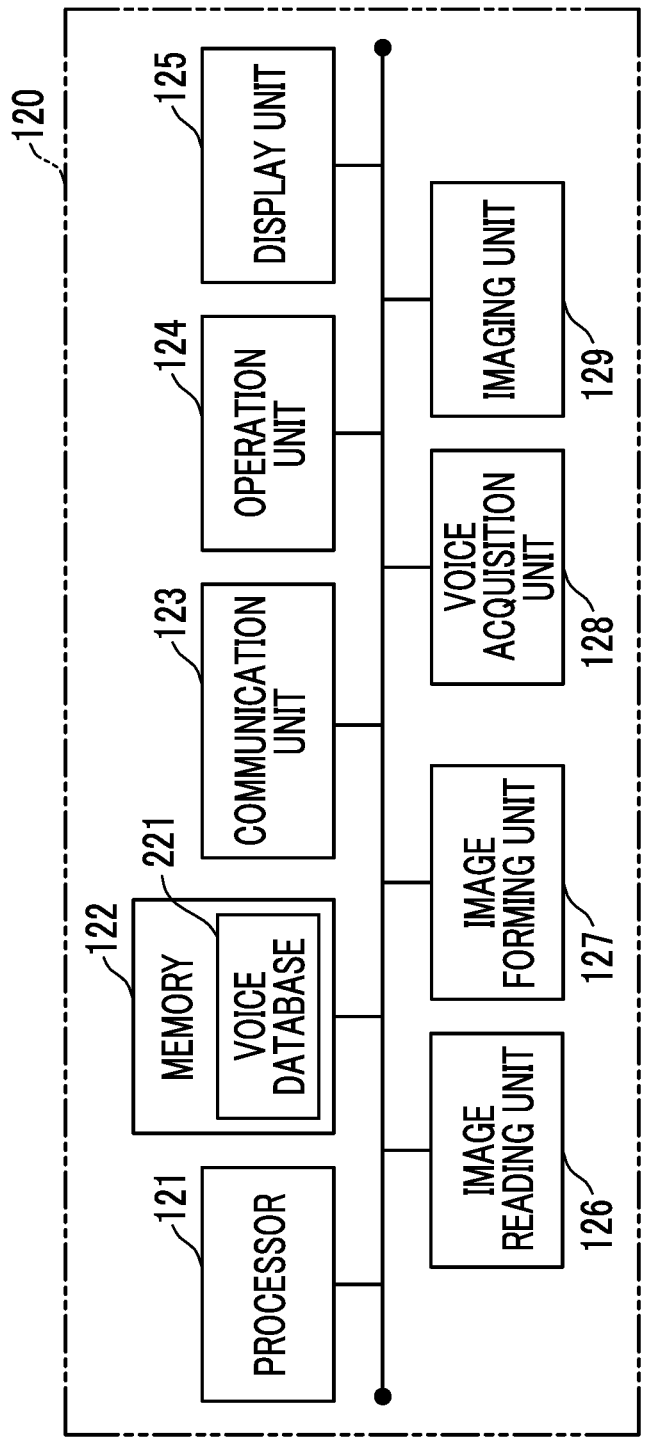
FIG. 2 is a diagram showing an example of a configuration of an image processing apparatus 120.

FIG. 2 is a diagram showing an example of a configuration of the image processing apparatus 120. The image processing apparatus 120 has a plurality of functions for processing an image such as a copy function, a print function, a scan function, and a facsimile function. The image processing apparatus 120 performs processing that realizes these functions according to an operation of the user. This operation includes a voice operation and an operation using a screen. The image processing apparatus 120 includes a processor 121, a memory 122, a communication unit 123, an operation unit 124, a display unit 125, an image reading unit 126, an image forming unit 127, a voice acquisition unit 128, and an imaging unit 129. These components are connected via a bus.

The processor 121 controls each unit of the image processing apparatus 120 by executing a program, and performs processing for realizing the functions of the image processing apparatus 120. A central processing unit (CPU) is used as the processor 121, for example. The memory 122 stores a program for executing the processing of the image processing apparatus 120 and a voice database 211 that stores the voice of the user registered in advance. For example, a read only memory (ROM) and a random access memory (RAM) are used as the memory 122. In addition to the ROM and the RAM, for example, a hard disk drive or a solid state drive (SSD) may be used as the memory 122. The communication unit 123 is connected to the communication line 130. The communication unit 123 performs data communication with the server apparatus 110 via the communication line 130. The operation unit 124 is used by the user who operates the image processing apparatus 120. For example, a touch panel and buttons are used as the operation unit 124. The display unit 125 displays various screens regarding the processing of the image processing apparatus 120. For example, a liquid crystal display is used as the display unit 125. The image reading unit 126 reads the image, and converts the image into image data. For example, an image scanner is used as the image reading unit 126. The image forming unit 127 forms the image corresponding to the image data on a medium such as paper. For example, a printer is used as the image forming unit 127. The voice acquisition unit 128 acquires the voice of the user. For example, a microphone is used as the voice acquisition unit 128. The imaging unit 129 images an image of the user. For example, a camera is used as the imaging unit 129.

Figure 3:
FIG. 3 is a diagram showing an example of a voice database 211.

FIG. 3 is a diagram showing an example of the voice database 211. The voice database 211 includes a user ID, a processing ID, and a voice. The user ID is information for uniquely identifying the user. The processing ID is information for uniquely identifying the processing. The processing ID also serves as a command for instructing selection or execution of the processing. The voice is a voice of an operation word of each processing uttered by the user. This voice is registered in advance by the user. Specifically, the user decides the operation word of each processing in advance, and registers the voice of the operation word in the voice database 211. For example, in a case where a user A decides that an operation word of copy processing is "copy", the user A utters a voice of "copy". The voice is acquired by the voice acquisition unit 128, is converted into a digital signal, and is then stored in association with a set of the user ID of the user A and the processing ID of the copy processing as shown in FIG. 3. In a case where the user A decides that an operation word of facsimile processing is "fax", the user A utters a voice of "fax". This voice is acquired by the voice acquisition unit 128, is converted into a digital signal, and is then stored in association with a set of the user ID of the user A and the processing ID of the facsimile processing as shown in FIG. 3.

The voice included in the voice database 211 is not limited to the voice of the user, and the voice may be a feature value of the voice of the user or may be a machine learning model obtained by performing machine learning on the voice of the user. The machine learning model is generated, for example, in such a manner that the user utters the voice of the operation word multiple times and the machine learning is performed on these voices. In a case where the voice is input, the machine learning model discriminates whether or not the voice is the corresponding voice of the user.

2. OPERATION

In the following description, a case where the processor 121 is described as a subject of the processing means that the program stored in the memory 122 is in cooperation with the processor 121 that executes this program, and thus, the processor 121 performs the processing by performing calculation or controlling an operation of another hardware element.

Figure 4:
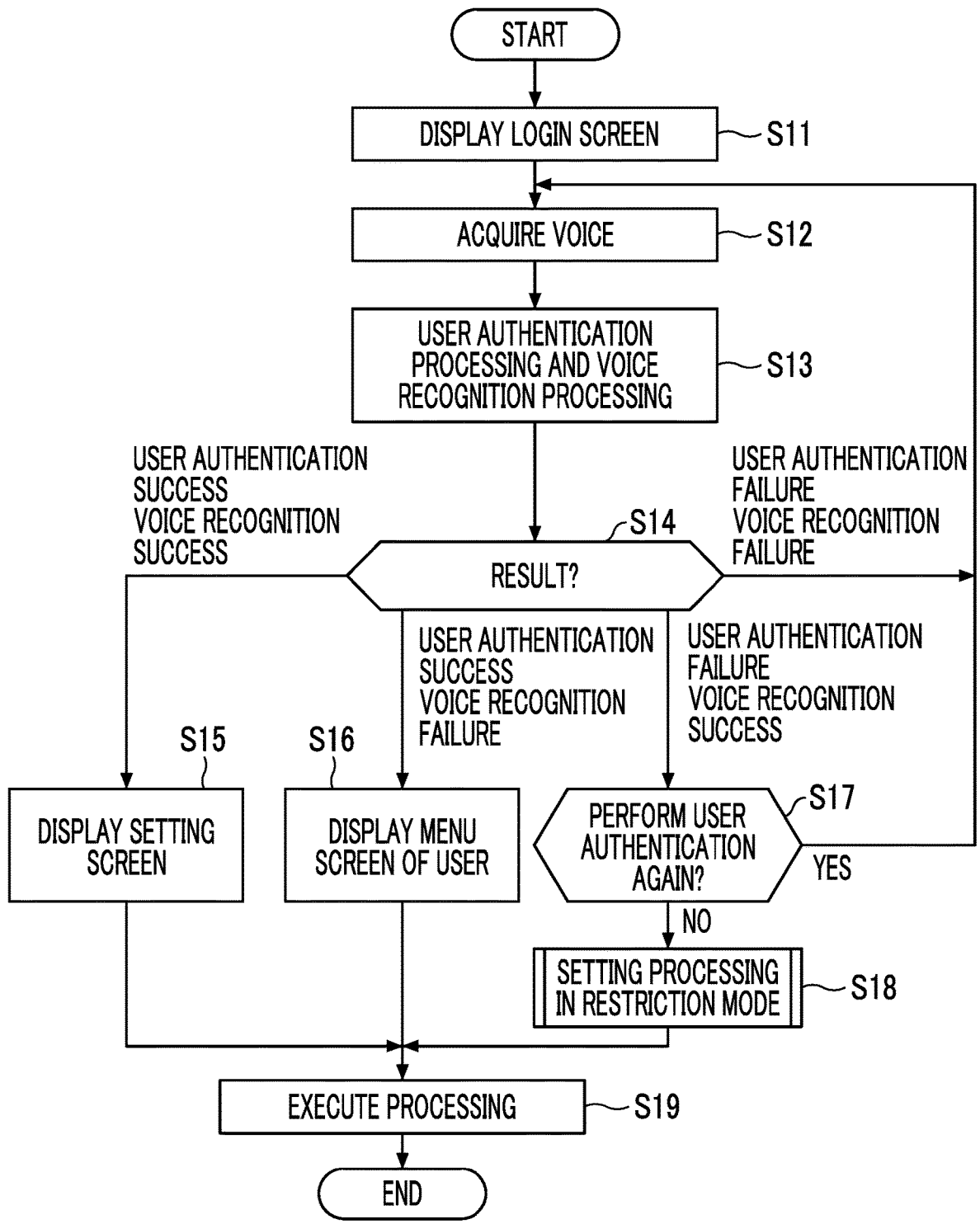
FIG. 4 is a flowchart showing an example of an operation of the image processing apparatus 120.
Figure 5:
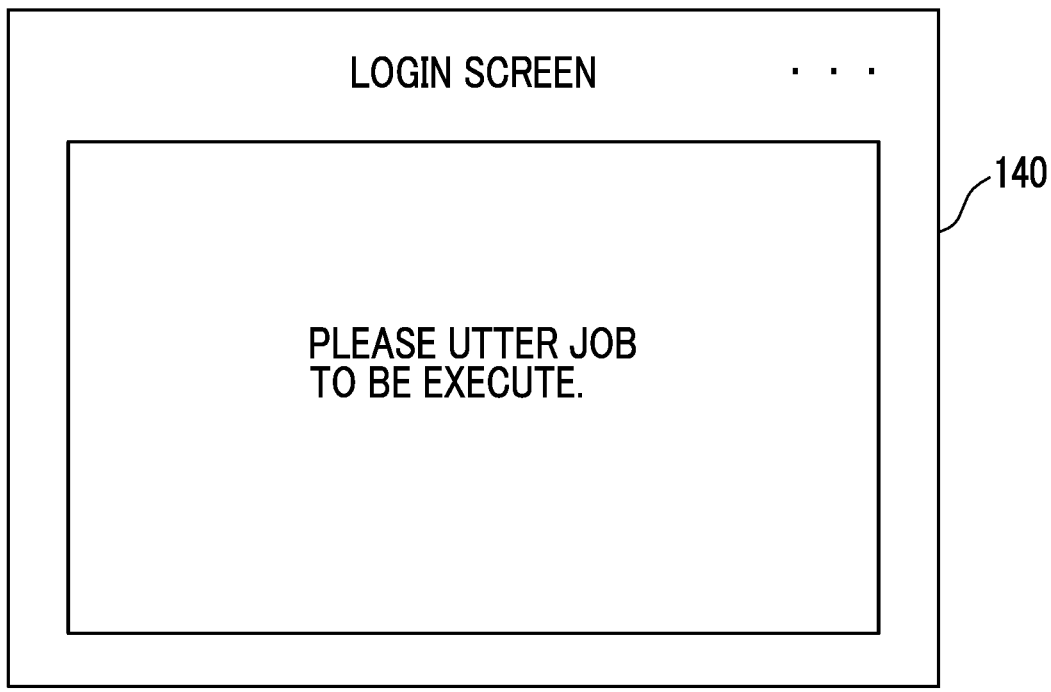
FIG. 5 is a diagram showing an example of a login screen 140.

FIG. 4 is a flowchart showing an example of an operation of the image processing apparatus 120. This operation is started, for example, in a case where the user uses the image processing apparatus 120. In step S11, the processor 121 displays a login screen 140 on the display unit 125. FIG. 5 is a diagram showing an example of the login screen 140. For example, in a case where a document image is copied and the operation word of the copy processing is "copy", the user utters the voice of "copy".

In step S12, the processor 121 acquires the voice of the user by the voice acquisition unit 128. For example, in a case where the user utters the voice of "copy", the voice acquisition unit 128 acquires this voice.

In step S13, the processor 121 performs user authentication processing and voice recognition processing by using the voice acquired in step S12. The user authentication processing and the voice recognition processing are simultaneously performed in parallel. That is, the voice recognition processing is performed regardless of a result of the user authentication processing. The "simultaneously performed" mentioned herein may not mean that the user authentication processing and the voice recognition processing are performed at exactly the same time, and may mean that the user authentication processing and the voice recognition processing are performed at slightly deviated times.

In the user authentication processing, the user is authenticated by using the voice. For example, a voiceprint of the voice acquired in step S12 is collated with a voiceprint of the voice included in the voice database 211 stored in the memory 122. Here, in a case where the voiceprint of the voice acquired in step S12 and the voiceprint of the voice associated with the user ID of the user A in the voice database 211 match each other, the user A is authenticated, and the user authentication succeeds. Meanwhile, in a case where there is no voice of which the voiceprint matches the voice acquired in step S12 in the voice database 211, the user is not authenticated, and the user authentication fails. For example, since a voice of a user who is not registered in advance is registered in the voice database 211, the user authentication fails. In a case where the voice database 211 includes the machine learning model of the voice of each user, the voice acquired in step S12 may be input to the machine learning model, and the voice of the user corresponding to the acquired voice may be discriminated.

In the voice recognition processing, the voice of the user is recognized. The "recognition of the voice" mentioned herein is not limited to the meaning of recognizing the operation word indicated by the voice, and also includes the meaning of identifying the target processing of the operation word indicated by the voice. For example, the voice acquired in step S12 is collated with the voice included in the voice database 211 stored in the memory 122. Here, in a case where the voice acquired in step S12 and the voice associated with the set of the user ID of the user A and the processing ID of the copy processing in the voice database 211 match each other, the operation word of the copy processing of the user A is recognized. In a case where the voice database 211 includes the machine learning model of the voice of each user, the voice acquired in step S12 may be input to the machine learning model, and the operation word corresponding to the processing may be discriminated. Meanwhile, for example, in a case where the user utters a voice indicating a word other than the operation word, the operation word is not recognized, and the voice recognition fails.

In step S14, the processor 121 determines the result of the user authentication processing and the result of the voice recognition processing performed in step S13. For example, in a case where both the user authentication and the voice recognition fail (the determination of step S14 is "user authentication failure and voice recognition failure"), the processing returns to step S11. At this time, a message indicating that the login fails may be displayed on the display unit 125. Meanwhile, in a case where both the user authentication and the voice recognition succeed (the determination of step S14 is "user authentication success and voice recognition success"), the processing proceeds to step S15.

In step S15, the processor 121 displays a setting screen 150 of the target processing of the operation word recognized by the voice recognition processing on the display unit 125. The setting screen 150 is used for an operation to execute the target processing. The operation of executing the target processing includes an operation of setting the target processing. The setting screen 150 may include information unique to the user recognized by the user authentication. The setting screen 150 is an example of an "operation screen" or a "first operation screen" according to the exemplary embodiment of the present invention.

Figure 6:
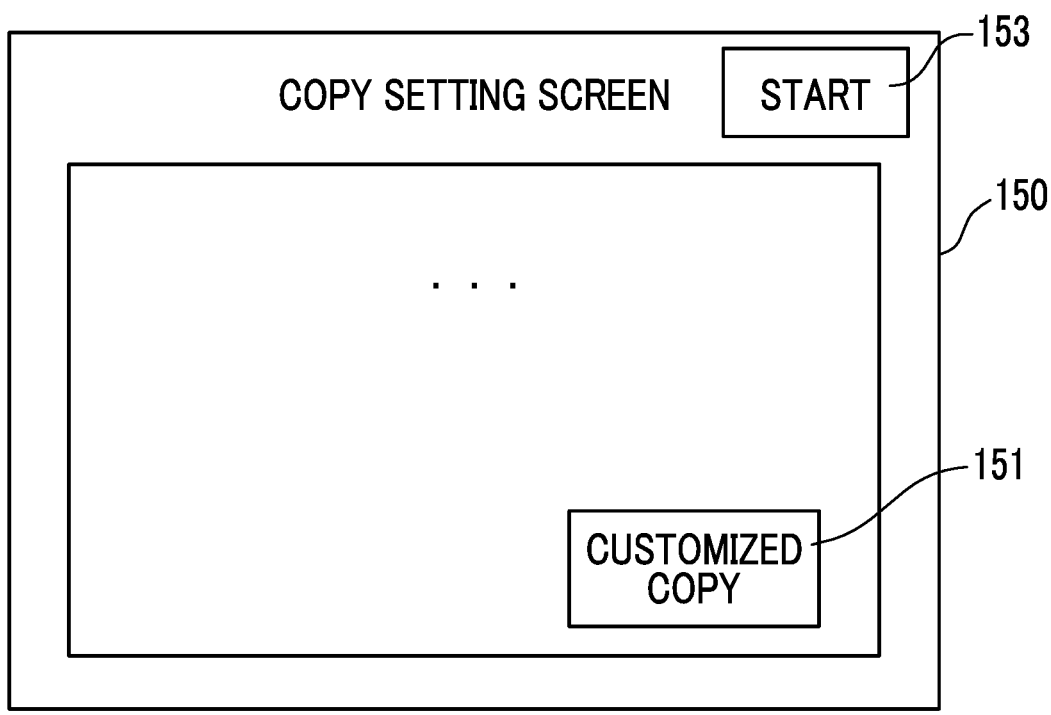
FIG. 6 is a diagram showing an example of a setting screen 150.

FIG. 6 is a diagram showing an example of the setting screen 150. Here, it is assumed that the user A is recognized by the user authentication processing and the operation word of the copy processing of the user A is recognized by the voice recognition processing. In this case, the setting screen 150 to be used for the operation of setting the copy processing is displayed as shown in FIG. 6. The user performs the setting operation of the copy processing by using the setting screen 150. The setting screen 150 may be a screen dedicated to the authenticated user A. For example, in a case where a setting value of the copy processing is set in advance by the user A, the setting screen 150 may include a setting button 151 indicating the setting value as shown in FIG. 6. This setting value may be a set of a plurality of setting values. The user may use a preset setting value of the copy processing by performing an operation of pressing the setting button 151. Meanwhile, in a case where the setting value of the copy processing is not set in advance by the user A, the setting screen 150 may include a setting button indicating the setting value used by the user A in the previous copy processing. In this case, the memory 122 stores a use history of the setting value of each processing for each user, and the setting value used in the previous copy processing by the user is specified based on the use history.

In a case where the operation word of the facsimile processing of the user A is recognized by the voice recognition processing, the setting screen to be used for the operation of setting the facsimile processing is displayed. Similarly, in a case where the operation word of the scan processing of the user A is recognized by the voice recognition processing, the setting screen to be used for the operation of setting the scan processing is displayed. Thus, in step S15, a different setting screen is displayed depending on the result of the voice recognition.

In a case where the result determined in step S14 is a result indicating that the user authentication succeeds and the voice recognition fails (the determination of step S14 is "user authentication success and voice recognition failure"), the processing proceeds to step S16. In step S16, the processor 121 displays a menu screen 160 dedicated to the user authenticated by the user authentication processing on the display unit 125. The menu screen 160 is used for an operation of executing the processing of the image processing apparatus 120. This operation includes an operation of selecting the processing of the image processing apparatus 120. The menu screen 160 includes information unique to the user recognized by the user authentication processing. The menu screen 160 is an example of an "operation screen" according to the exemplary embodiment of the present invention.

FIG. 7 is a diagram showing an example of the menu screen 160. Here, it is assumed that the user A is recognized by the user authentication processing. As shown in FIG. 7, the menu screen 160 includes selection buttons 161 to 163 to be used for operations for selecting the copy processing, the scan processing, and the facsimile processing. The selection buttons 161 to 163 receive operations for selecting the processing of the image processing apparatus 120. The user A may select anyone of the copy processing, the scan processing, and the facsimile processing by performing the operation of selecting any one of the selection buttons 161 to 163. In a case where anyone of the copy processing, the scan processing, and the facsimile processing of the image processing apparatus 120 is selected, the setting screen for setting the processing is displayed. For example, in a case where the operation of pressing the selection button 161 is performed, since the copy processing is selected, the setting screen 150 of the copy processing shown in FIG. 6 is displayed.

In a case where the user A sets the setting values in advance for the copy processing and the scan processing, the menu screen 160 includes the selection buttons 164 and 165 to be used for the operations of selecting the copy processing and the scan processing according to the preset setting values. This setting value may be a set of a plurality of setting values. The user A may select the copy processing or the scan processing according to the preset setting value by performing the operation of pressing the selection button 164 or 165.

As shown in FIG. 7, the menu screen 160 may include voice operation guidance information 166. The guidance information 166 may include an operation word of specific processing. This specific processing may be, for example, processing of which a usage frequency of the user A is equal to or greater than a threshold value. In this case, the usage frequency of each processing is counted for each user, and is stored in the memory 122. For example, in a case where the usage frequency of the copy processing by the user A is equal to or greater than the threshold value, the guidance information 166 includes the operation word of "copy" indicated by the voice associated with the user ID of the user A and the processing ID of the copy processing in the voice database 211 shown in FIG. 3.

In a case where the result determined in step S14 is the result indicating that the user authentication fails and the voice recognition succeeds (the determination of step S14 is "user authentication failure and voice recognition success"), the processing proceeds to step S17. In step S17, the processor 121 determines whether to perform user authentication again. At this time, the processor 121 displays an authentication result screen 170 indicating the authentication result on the display unit 125. FIG. 8 is a diagram showing an example of the authentication result screen 170. Here, it is assumed that the user authentication fails but the operation word of the copy processing of "copy" is recognized by the voice recognition processing. As shown in FIG. 8, the authentication result screen 170 includes an authentication result indicating that the user authentication fails and the voice recognition result of "copy". The authentication result screen 170 includes a selection button 171 to be used for an operation of selecting re-execution of the user authentication, and a selection button 172 used for an operation of selecting execution of processing in a restriction mode. The restriction mode is an operation mode in which the functions are restricted compared to a case where the user authentication succeeds. In the restriction mode, execution of processing considered to have no problem from the viewpoint of information security is performed. That is, in the restriction mode, the execution of the processing considered to have a problem from the viewpoint of information security is prohibited. As stated above, even in a case where the user authentication fails, it is possible to execute the processing in the restriction mode. Thus, the user cannot be specified but the voice recognition succeeds. Further, since the user can recognize intended processing, it is considered that the execution of the processing may be permitted in a range in which a problem is not caused from the viewpoint of information security.

In a case where the user authentication is performed again, the user performs the operation of pressing the selection button 171. In a case where this operation is performed, it is determined that the user authentication is performed again (YES in the determination of step S17), and the processing returns to step S11. Meanwhile, in a case where the processing is executed in the restriction mode without performing the user authentication again, the user performs the operation of pressing the selection button 172. In a case where this operation is performed, it is determined that the user authentication is not performed again (NO in the determination of step S17), and the processing proceeds to the setting processing in the restriction mode of step S18.

Figure 9:
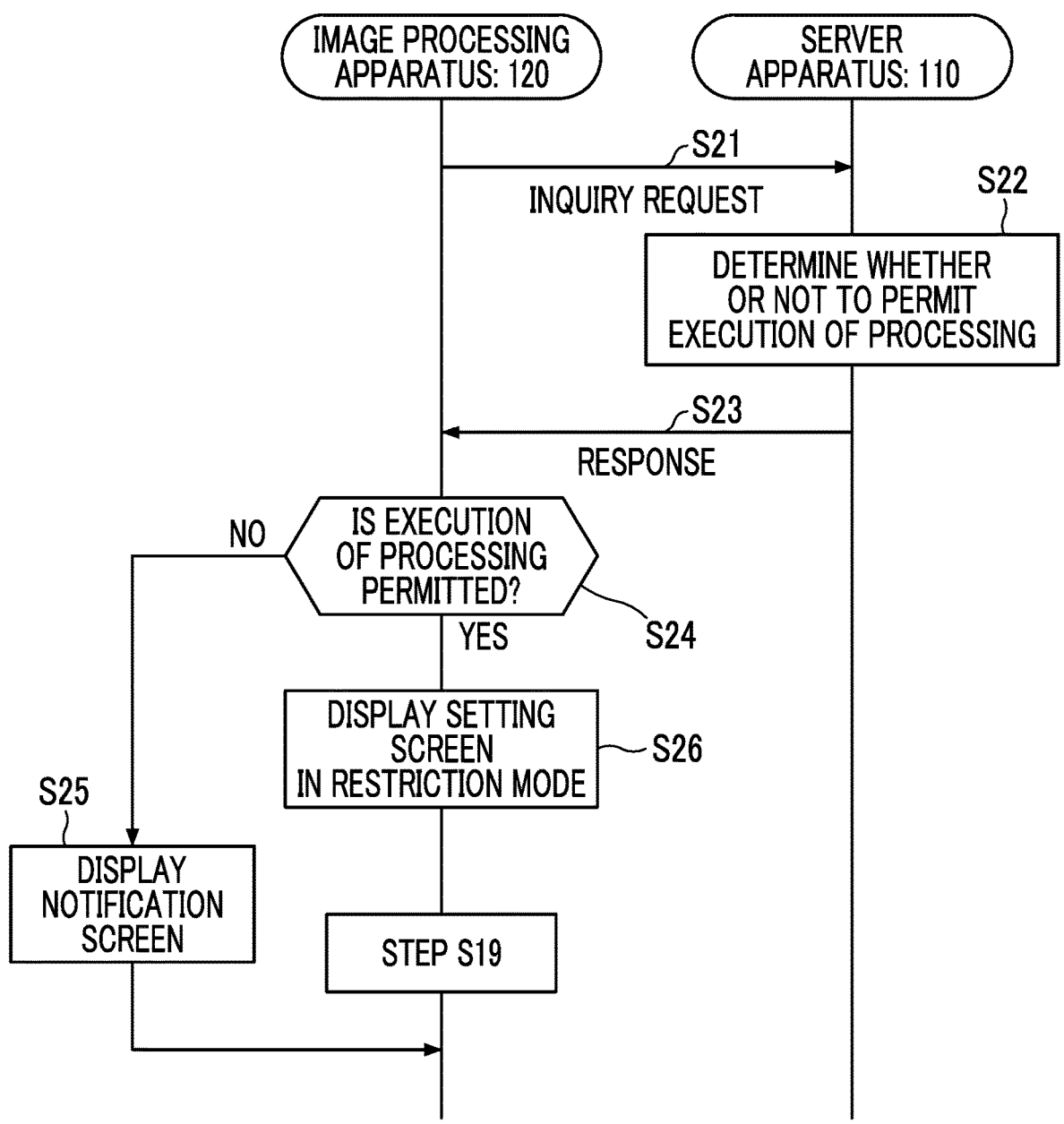
FIG. 9 is a sequence chart showing an example of setting processing in a restriction mode.

FIG. 9 is a sequence chart showing an example of the setting processing of the restriction mode. Similarly to the image processing apparatus 120, the server apparatus 110 includes a processor, a memory, and a communication unit. In the following description, a case where the server apparatus 110 is described as a subject of the processing means that the program stored in the memory is in cooperation with the processor that executes this program, and thus, the processor performs the processing by performing calculation or controlling an operation of another hardware element.

Figure 10:
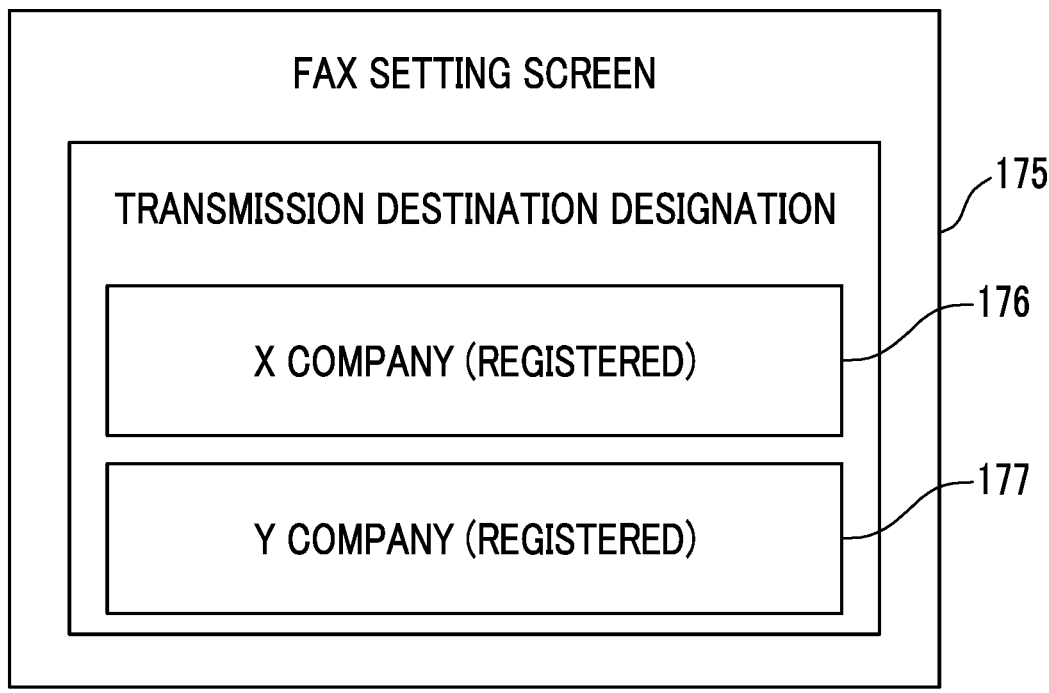
FIG. 10 is a diagram showing an example of a setting screen 175 of a facsimile transmission destination.

In step S21, the processor 121 of the image processing apparatus 120 transmits an inquiry request as to whether or not the target processing may be executed to the server apparatus 110. This request includes image data indicating an image to be used for the target processing. For example, in a case where the operation word of the copy processing is recognized by the voice recognition processing, since the target processing is the copy processing, the inquiry request includes image data indicating a document image read by the image reading unit 126. Meanwhile, in a case where the operation word of the facsimile processing is recognized in step S13, the target processing is the facsimile processing. In this case, the processor 121 first displays a setting screen 175 of a facsimile transmission destination on the display unit 125. FIG. 10 is a diagram showing an example of the setting screen 175 of the facsimile transmission destination. The setting screen 175 receives an operation of designating a facsimile transmission destination. However, the setting screen 175 receives an operation of designating only a transmission destination registered in advance as the transmission destination. For example, as shown in FIG. 10, the setting screen 175 includes selection buttons 176 and 177 for receiving operations of selecting the company X and the company Y which are transmission destinations registered in advance. Meanwhile, the setting screen 175 does not include an operation image for receiving an operation of designating a new transmission destination, and does not receive such an operation. The user performs an operation of designating a transmission destination by using the setting screen 175. For example, in a case where the user performs an operation of pressing the selection button 176, the facsimile transmission destination is designated as "company X". In this case, the inquiry request includes the image data indicating the document image read by the image reading unit 126 and transmission destination information indicating the transmission destination of "company X". The inquiry request may not be transmitted. For example, in a case where the target processing is the scan processing, the inquiry request may not be transmitted.

In step S22, the server apparatus 110 determines whether or not to execute the target processing based on the image data received from the image processing apparatus 120. For example, the server apparatus 110 recognizes the text included in the image data by OCR. For example, in a case where the image data includes a specific text, it is determined that the execution of the target processing is prohibited. The specific text is, for example, a text such as "in-house secret" or "copy prohibited", and may be predetermined in advance for each processing. For example, in a case where the transmission destination information is received together with the image data and a text string indicating the transmission destination included in the image data does not indicate the transmission destination indicated by the transmission destination information, it is determined that the execution of the target processing is prohibited. Meanwhile, in other cases, it is determined that the execution of the target processing is permitted. In step S23, the server apparatus 110 transmits a response indicating a determination result of step S22 to the image processing apparatus 120.

Figure 11:
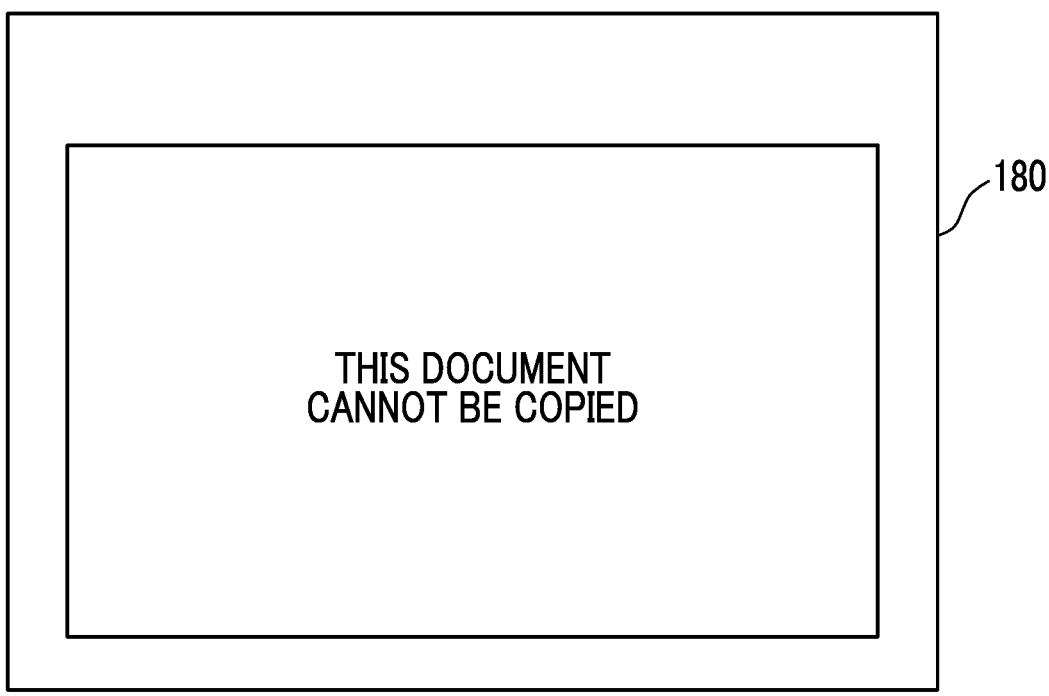
FIG. 11 is a diagram showing an example of a notification screen 180.

In step S24, the processor 121 of the image processing apparatus 120 determines whether or not the execution of the target processing is permitted based on the response received from the server apparatus 110. For example, in a case where the response of the server apparatus 110 indicates the determination result indicating that the execution of the target processing is prohibited, it is determined that the execution of the target processing is prohibited (the determination of step S24 is NO). In this case, in step S25, the processor 121 displays a notification screen 180 for notifying that the target processing is not executed on the display unit 125. FIG. 11 is a diagram showing an example of the notification screen 180 to be displayed in a case where the target processing is the copy processing. As shown in FIG. 11, the notification screen 180 includes a message indicating that the copy processing is not executed.

Meanwhile, in step S24, in a case where the response of the server apparatus 110 indicates the determination result indicating that the execution of the target processing is permitted, it is determined that the execution of the target processing is permitted (the determination of step S24 is YES). In this case, in step S26, the processor 121 displays the setting screen of the target processing in the restriction mode on the display unit 125. Similarly to the setting screen 150 displayed in a case where the user authentication succeeds, this setting screen of the restriction mode is used for the operation of executing the target processing of the operation word recognized by the voice recognition processing. This operation includes an operation of setting the target processing. However, on the setting screen of the restriction mode, the setting value to be set are restricted compared to the setting value of the setting screen 150 displayed in a case where the user authentication succeeds. Only the setting value considered to have no problem from the viewpoint of information security may be set on the setting screen of the restriction mode. In other words, the setting value considered to have problem from the viewpoint of information security may not be set on the setting screen of the restriction mode. The setting screen of the restriction mode is an example of a "second operation screen" according to the exemplary embodiment of the present invention. The setting value to be set in the restriction mode is predetermined in advance for each processing.

For the copy processing and the print processing, for example, the color is limited to a monochromatic color, and the number of copies is limited to be equal to or less than an upper limit. For the print processing, only Universal Serial Bus (USB) printing is permitted, and net printing cannot be enabled. This USB printing is a function of printing an image corresponding to image data stored in a USB memory. The net printing is a function of printing an image corresponding to image data transmitted via a communication line such as the Internet. Since users of the net printing are an unspecified number of persons and users of the USB printing are limited to persons who are in the vicinity of the image processing apparatus 120, it is considered that an information security risk of the USB printing is smaller. For the facsimile processing, for example, the transmission destination is limited to the transmission destination registered in advance, printing of transmission source information cannot be disabled, and redialing cannot be enabled. This redialing is a function of automatically redialing in a case where the first facsimile transmission fails. For the scan processing, for example, a storage destination is limited to a guest storage destination, and an attribute of an image is limited to a read-only attribute. In a case where the attribute of the image is the read-only attribute, the image cannot be edited.

Figure 12:
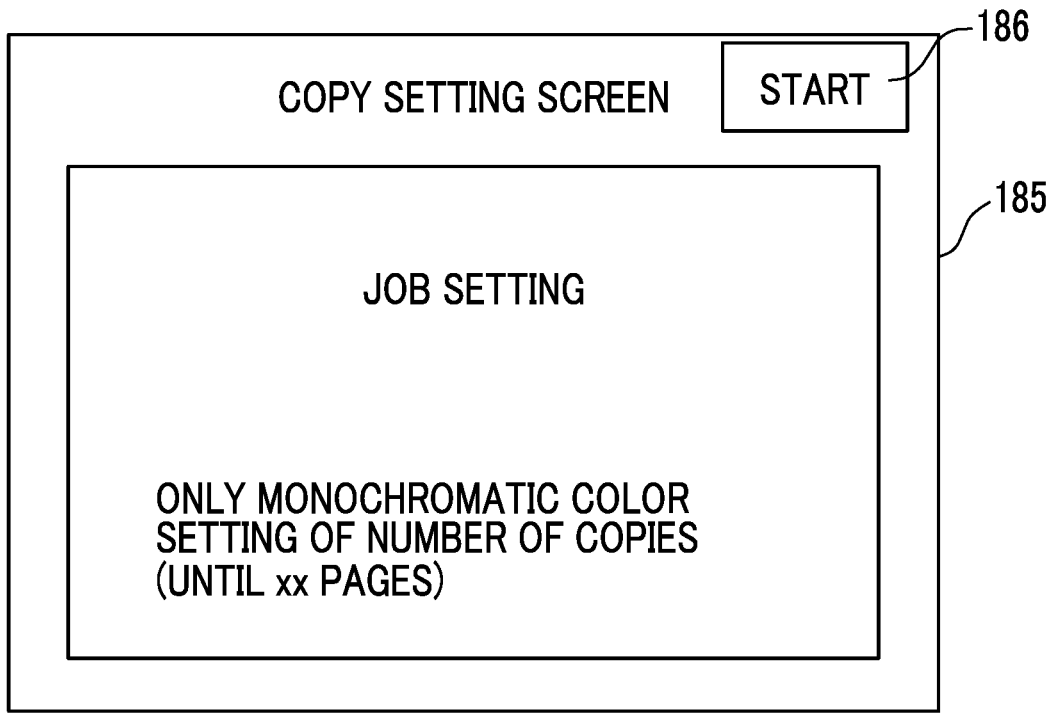
FIG. 12 is a diagram showing an example of a setting screen 185 in the restriction mode in a case where target processing is copy processing.

FIG. 12 is a diagram showing an example of a setting screen 185 of the restriction mode to be displayed in a case where the target processing is the copy processing. This setting screen 185 is used for an operation of setting the copy processing. However, in the setting screen 185, the setting value to be set are limited compared to the setting screen 150 shown in FIG. 6. For example, the setting screen 150 receives both the operation of setting the monochromatic color and the operation of setting the color, but the setting screen 185 receives only the operation of setting the monochromatic color and does not receive the operation of setting the color. The setting screen 150 receives the operation of setting the number of copies for any number of copies, but the setting screen 185 does not receive the operation of setting the number of copies exceeding the upper limit.

Figure 13:
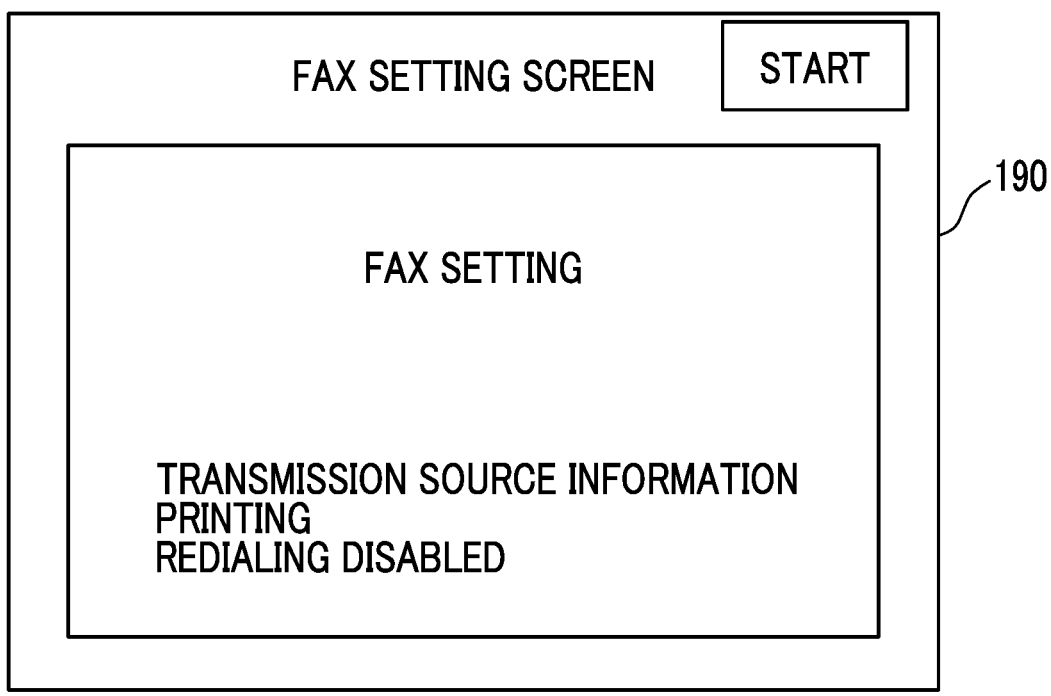
FIG. 13 is a diagram showing an example of a setting screen 190 in the restriction mode in a case where the target processing is facsimile processing.

FIG. 13 is a diagram showing an example of a setting screen 190 of the restriction mode to be displayed in a case where the target processing is the facsimile processing. The setting screen 190 is used for an operation of setting the facsimile processing. However, similarly to the setting screen 185 shown in FIG. 12, the setting value to be set is limited on the setting screen 190. In the restriction mode, a setting for printing the transmission source information is enabled in an initial setting, and the setting screen 190 does not receive an operation of disabling the setting for printing the transmission source information. The setting screen 190 does not receive an operation of enabling the redialing.

As stated above, different operation screens are displayed on the display unit 125 depending on the result of the user authentication and the result of the voice recognition. After step S15, S16, or S26, the processing proceeds to step S19 shown in FIG. 4. In step S19, the processor 121 executes the processing according to the content set by the operation of the user. For example, in a case where an operation of pressing a start button 153 is performed after the color and 10 copies are set on the setting screen 150 shown in FIG. 6, 10 copies of a color image corresponding to the image data are formed on a sheet by the image forming unit 127. In a case where the operation of pressing the start button 186 is performed after the monochromatic color and one copy are set on the setting screen 185 shown in FIG. 12, one copy of a monochromatic image corresponding to the image data is formed on the sheet by the image forming unit 127. In the restriction mode, the content of the processing to be executed is restricted compared to a case where the user authentication succeeds.

According to the aforementioned exemplary embodiment, since the menu screen 160 of the user is displayed in a case where the user authentication succeeds and the voice recognition fails and the setting screen of the restriction mode is displayed in a case where the user authentication fails and the voice recognition succeeds, even though the user is not authenticated or the voice of the user is not recognized, it is possible to operate the processing according to the authentication result of the user and the recognition result of the voice. In a case where the voice recognition succeeds even though the user authentication fails, since the setting screen of the processing in the restriction mode is displayed, it is possible to execute the processing with restricted functions in a range in which the problem is not caused from the viewpoint of information security by using the restricted setting value. Thus, even though the accuracy of the user authentication is low, it is possible to suppress deterioration of the convenience of the user. Since the setting screen 150 and the setting screen of the restriction mode receive the operation of the target processing of the operation word recognized by the voice recognition processing, time and effort in the operation of selecting the target processing can be saved. Since the setting screen 150 and the menu screen 160 include information unique to the user authenticated in the user authentication processing, convenience is improved.

Since the voice of the operation word of the user is registered in advance and the voice recognition is performed in collation with this voice, even though a pronunciation of the user is considerably different from a standard pronunciation due to problems such as accent and tongue, it is possible to recognize the operation word. As a result, the accuracy of the voice recognition is improved. Since the operation word can be freely decided by the user, it is possible to prevent other users from illegally performing the voice operation by an impersonation behavior. As a result, information security is strengthened. Since the setting screen 150 or the menu screen 160 is displayed by the voice operation of the user, it is possible to recognize the content of the processing before the processing is executed. As stated above, the operation of the user is required before the processing is executed, and thus, it is possible to prevent processing different from the processing intended by the user from being executed even though the accuracy of the voice recognition is low.

Since the setting screen 150 includes the setting button 151 indicating the setting value of the copy processing set in advance by the user, this setting value can be used more easily compared to a case where the setting button 151 is not included. In a case where the setting screen 150 includes a setting button indicating the setting value used by the user in the previous copy processing, this setting value can be used more easily compared to a case where the setting button is not included.

3. MODIFICATION EXAMPLE

The exemplary embodiment described above is an example of the present invention. The present invention is not limited to the aforementioned exemplary embodiment. The aforementioned exemplary embodiment may be modified and implemented as in the following examples. At this time, the following two or more modification examples may be used in combination.

In the aforementioned exemplary embodiment, the processor 121 may not display the setting screen 150 in a case where the user authentication and the voice recognition succeed. For example, in this case, the processor 121 may execute the target processing with no operation of the user without displaying the setting screen 150. For example, the user may set the setting value in advance for routine processing. In a case where the target processing is such processing, the processing may be executed according to the setting value set in advance without displaying the setting screen 150 even though the user does not perform the operation by using the operation unit 124. According to this modification example, the processing is executed only by uttering the voice of the operation word even though the user does not perform the operation using the screen. In this modification example, in a case where the user does not perform the work required to execute the target processing, information for prompting the user to perform this work may be displayed on the display unit 125. For example, in a case where the target processing is the copy processing and a document is not placed on the image reading unit 126, a message for prompting a work of placing the document may be displayed on the display unit 125. Whether or not the document is placed on the image reading unit 126 is determined by using, for example, a sensor that detects the document. According to this modification example, the user can understand the work required to execute the processing.

In the aforementioned exemplary embodiment, the user authentication using the image captured by the imaging unit 129 may be performed in addition to the user authentication using the voice. The processor 121 authenticates the user by collating a face image of the user captured by the imaging unit 129 with a face image of the user registered in advance. As stated above, for example, it is possible to prevent an impersonation behavior such as performing a voice operation using a voice of another person recorded in advance in a recorder by performing the user authentication using the image in addition to the user authentication using the voice.

In the aforementioned exemplary embodiment, the user authentication processing and the voice recognition processing may be performed only in a case where the user is on a front side of the image processing apparatus 120. The front side refers to a direction in which the user who operates the image processing apparatus 120 stands as viewed from the image processing apparatus 120. In this case, the imaging unit 129 images an image of the front side of the image processing apparatus 120 in a case where the voice of the user is acquired. For example, the processor 121 detects the user on the front side of the image processing apparatus 120 by analyzing the image captured by the imaging unit 129. Alternatively, the processor 121 may detect the user on the front side of the image processing apparatus 120 by using an infrared sensor. In a case where the user on the front side of the image processing apparatus 120 is detected, the processor 121 performs the user authentication processing and the voice recognition processing. In this case, as described above, the user authentication using the image captured by the imaging unit 129 may be performed in addition to the user authentication using the voice. Meanwhile, in a case where the user on the front side of the image processing apparatus 120 is not detected, the processor 121 does not perform the user authentication processing and the voice recognition processing. According to this modification example, for example, it is possible to prevent the user authentication processing and the voice recognition processing from being performed by a voice uttered by a person other than the user who does not intend to operate the image processing apparatus 120.

In the aforementioned exemplary embodiment, in a case where the user authentication fails and the voice recognition succeeds, the processing may return to step S11, and the login screen 140 may be displayed. In a case where the processing returns to step S11, the user authentication may be performed by another authentication method different from the user authentication using the voice. The other authentication method may be, for example, an authentication method using an image of the user captured by the imaging unit 129. In this case, the processor 121 authenticates the user by collating the face image of the user captured by the imaging unit 129 with the face image of the user registered in advance. In a case where the user authentication succeeds, the processor 121 displays the setting screen 150 on the display unit 125. According to this modification example, the image processing apparatus 120 can be used even in a case where the user is not authenticated by the voice.

In the aforementioned exemplary embodiment, in a case where the user authentication fails and the voice recognition succeeds, a menu screen common to all users may be displayed instead of the menu screen 160 dedicated to the user. The menu screen common to all the users does not include information unique to the user, for example, the selection buttons 164 and 165 and the guidance information 166.

In the aforementioned exemplary embodiment, in a case where the processing returns to step S11 after the processing of step S14, the user authentication may be performed by another authentication method different from the user authentication using the voice. In this case, the processor 121 displays an authentication screen used for user authentication by another authentication method on the display unit 125. The other authentication method may be, for example, an authentication method using an image of the user captured by the imaging unit 129. In a case where the voice recognition succeeds and the user authentication succeeds by another authentication method, the processor 121 displays the setting screen 150 on the display unit 125. According to this modification example, even in a case where the user is not authenticated by the voice, the image processing apparatus 120 can be used to execute the processing.

In the aforementioned exemplary embodiment, the operation word may not have to be a name of the processing. For example, the operation word may include a user name. In a case where this operation word is recognized, for example, the menu screen 160 dedicated to the user corresponding to this user name is displayed.

The subject of the processing of the image processing system 100 according to the aforementioned exemplary embodiment is an example, and the present invention is not limited to this example. For example, at least a part of the processing performed by the image processing apparatus 120 may be performed by another apparatus. At least a part of the processing performed by the server apparatus 110 may be performed by another apparatus. For example, the image processing apparatus 120 may determine whether or not to permit the execution of the processing in the restriction mode instead of the server apparatus 110. In this case, the server apparatus 110 may not be provided. The processing of the image processing system 100 according to the aforementioned exemplary embodiment is an example, and the order may be changed as long as there is no contradiction.

In the aforementioned exemplary embodiment, the information processing apparatus according to the exemplary embodiment of the present invention is not limited to the image processing apparatus 120. The information processing apparatus may be any apparatus such as a smartphone or a personal computer as long as the information processing apparatus is an apparatus that executes the processing corresponding to the operation of the user. For example, in a smartphone, in a case where the user utters a voice of an operation word of "mail" decided in advance for processing of an email, the user authentication processing and the voice recognition processing are performed by using this voice, and in a case where the user authentication and the voice recognition succeed, an e-mail application program may be started, and a mail screen used for an e-mail operation may be displayed.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The term "processor" is broad enough to encompass one processor or plural processors in collaboration which are located physically apart from each other but may work cooperatively. The order of the operations of the processor is not limited to the order described in the aforementioned exemplary embodiment, and may be appropriately changed.

The present invention may be provided as a program executed in each of the image processing apparatus 120 and the server apparatus 110. The image processing apparatus 120 and the server apparatus 110 are examples of computers according to the exemplary embodiment of the present invention. This program may be downloaded via a communication line such as the Internet, or may be provided in a state of being recorded in a computer readable recording medium such as a magnetic recording medium (magnetic tape and magnetic disk), an optical recording medium (optical disk), a magneto-optical recording medium, and a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire a voice of a user;
authenticate the user by using the voice, and recognize the voice in parallel; and
display operation screens that are different depending on an authentication result of the user and a recognition result of the voice and are used for an operation of executing processing on a display unit,
wherein, in a case where the user is authenticated, the operation screens are different depending on the recognition result of the voice, and
the operation screen includes a setting value of the processing determined in advance for the authenticated user.

2. The information processing apparatus according to claim 1,
wherein, in a case where the setting value is not determined in advance, the operation screen includes a setting value previously used for the processing.

3. The information processing apparatus according to claim 1,
wherein the processor is configured to execute the processing even though the operation is not performed without displaying the operation screen in a case where the user is authenticated.

4. The information processing apparatus according to claim 3,
wherein the processor is configured to, in a case where a work required to execute the processing is not performed by the user, display information for prompting the user to perform the work on the display unit.

5. The information processing apparatus according to claim 1,
wherein the processor is configured to perform the authentication of the user and the recognition of the voice according to detection of the user who is on a front side of the information processing apparatus.

6. The information processing apparatus according to claim 1,
wherein the processor is configured to authenticate the user by using an image of the user captured by an imaging unit in a case where the user is not authenticated by using the voice and the voice is recognized, and is configured to display the operation screen in a case where the user is authenticated by using the image.

7. The information processing apparatus according to claim 1,
wherein the processor is configured to display an authentication screen used for authenticating the user by an other authentication method on the display unit other than the authentication of the user by using the voice of the user in a case where the user is not authenticated by using the voice.

8. The information processing apparatus according to claim 7, wherein the processor is configured to display the operation screen on the display unit in a case where the voice is recognized and the user is authenticated by the other authentication method other than the authentication of the user by using the voice of the user.

9. The information processing apparatus according to claim 1, wherein the processor is configured to display a second operation screen of which a setting value is restricted compared to a first operation screen on the display unit in a case where the user is not authenticated and the voice is recognized, the first operation screen being displayed in a case where the user is authenticated.

10. The information processing apparatus according to claim 1, wherein the processor is configured to restrict a function in a case where the user is not authenticated and the voice is recognized, compared to a case where the user is authenticated.

11. The information processing apparatus according to claim 1, wherein the authentication of the user and the recognition of a command are performed by using a same voice input acquired from the voice of the user.

12. A non-transitory computer readable medium storing a program causing a computer to execute a process, the process comprising:
   acquiring a voice of a user;
   authenticating the user by using the voice, and recognizing the voice in parallel; and
   displaying operation screens that are different depending on an authentication result of the user and a recognition result of the voice and are used for an operation of executing processing on a display unit,
   wherein, in a case where the user is authenticated, the operation screens are different depending on the recognition result of the voice, and
   the operation screen includes a setting value of the processing determined in advance for the authenticated user.

* * * * *